United States Patent [19]

Nicholson et al.

[11] Patent Number: 4,957,823
[45] Date of Patent: Sep. 18, 1990

[54] COMPOSITE SHEET MADE OF MOLYBDENUM AND DISPERSION-STRENGTHENED COPPER

[75] Inventors: Richard D. Nicholson, Chardon; Ronald S. Fusco, Mentor, both of Ohio

[73] Assignee: AMAX Inc., New York, N.Y.

[21] Appl. No.: 357,835

[22] Filed: May 30, 1989

[51] Int. Cl.$^5$ .............................................. B32B 15/01
[52] U.S. Cl. .................................................. 428/663
[58] Field of Search ........................................ 428/663

[56] References Cited

U.S. PATENT DOCUMENTS 4,025,997  5/1977  Germitis et al. ..................... 428/663

FOREIGN PATENT DOCUMENTS 59-152655  8/1984  Japan .

*Primary Examiner*—Theodore Morris
*Assistant Examiner*—David W. Schumoker
*Attorney, Agent, or Firm*—Michael A. Ciomek; Eugene J. Kalil

[57] ABSTRACT

Directed to the production of composite copper-molybdenum sheet by assembling at least one plate of molybdenum with at least one plate of dispersion-strengthened copper to form a composite billet, heating the billet in a protective atmosphere to a temperature within the hot working range for copper, working the billet in a protective atmosphere to effect a reduction in thickness of at least about 40% to bond said dispersion-strengthened copper and said molybdenum together and thereafter further working the resulting bonded billet.

5 Claims, 1 Drawing Sheet

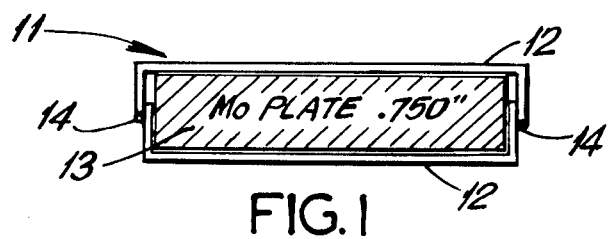
FIG. 1
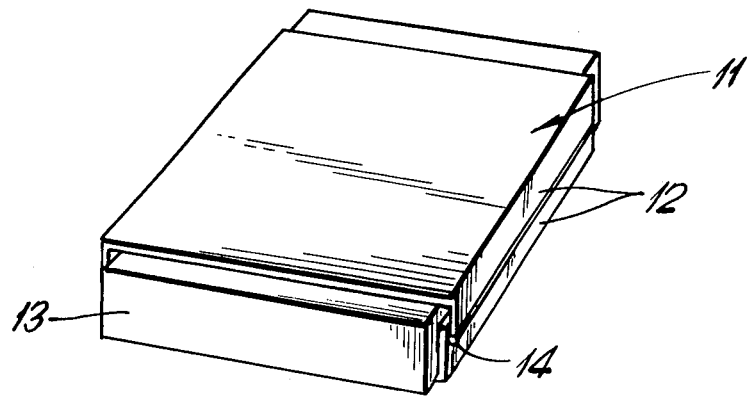
FIG. 2
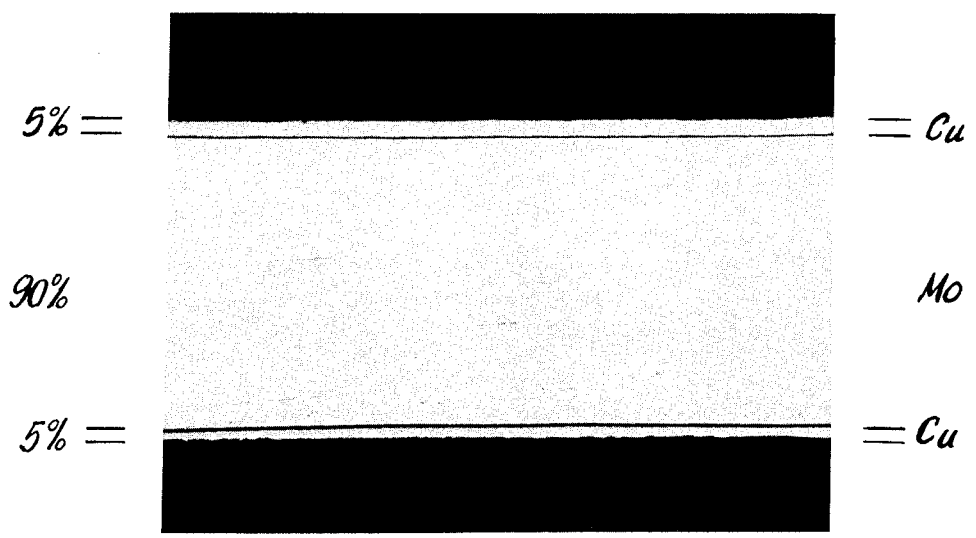
FIG. 3  Mag 50x

COMPOSITE SHEET MADE OF MOLYBDENUM AND DISPERSION-STRENGTHENED COPPER

The invention is directed to composite materials in sheet form wherein dispersion-strengthened copper and molybdenum are bonded together in layers.

BACKGROUND OF THE INVENTION

It has long been known that unique combinations of properties can be obtained in many articles by producing such articles as composite materials, so as to utilize desirable properties contributed by dissimilar materials incorporated in the composite structure. Examples which quickly come to mind include glass-fiber reinforced plastic articles widely used in marine and aviation applications such as boats, carbon fiber reinforced articles such as golf club shafts and many other articles, composite copper-cored coins such as the United States dime, quarter, etc. It has been recognized that special combinations of properties can be provided by the composite route which are not possible in a single material.

Inevitably, the demand for highly specialized combinations of properties in materials becomes more acute as the requirements imposed by increased sophistication in industry become more severe. For example, the electronics industry has been subject to increased demands for materials having specialized combinations of properties including expansivity, conductivity, density, strength and modulus as miniaturization of equipment coupled with higher power and the generation of more heat in smaller packages has proceeded.

It is recognized that copper is a metal characterized by high conductivity for heat and electricity which suffers drawbacks in terms of desired strength for many applications. Copper is relatively soft and malleable and is readily workable. Molybdenum is a metal characterized by high melting point, 2610° C., whereas copper melts at 1083° C. Molybdenum is strong and retains its strength at elevated temperatures, e.g., 1000° C. Copper and molybdenum are essentially immiscible at any temperature. Forging temperatures for molybdenum are said to be generally between 1180° and 1290° C., a temperature range exceeding the melting point of copper. The expansivity of copper is much higher than that of molybdenum.

A review of the differences in properties and characteristics between molybdenum and copper would lead one skilled in the art to believe that molybdenum and copper could not be combined in a composite structure due to the great disparity in properties between the two metals. Such a composite has heretofore been unknown.

The present invention is based on the discovery of a method for producing composite sheet of copper and molybdenum. The invention also contemplates using dispersion strengthened copper as the copper layer to obtain further improvements in properties of the composite.

BRIEF STATEMENT OF THE INVENTION

The invention contemplates producing composite molybdenum-copper sheet by assembling at least one plate of molybdenum with at least one plate of dispersion-strengthened copper to form a composite billet, heating the resulting composite billet in a protective atmosphere to a temperature within the hot working temperature range for copper, working said billet in a protective atmosphere to effect a reduction in thickness thereof of at least about 40% to bond said dispersion-strengthened copper and said molybdenum together and thereafter further reducing the thickness of the bonded billet by hot and/or cold working. Composite sheets of sandwich configuration with either dispersion-strengthened copper or molybdenum in the center can be produced.

The term "dispersion-strengthened copper" is used herein in the sense of the description given at pages 711 to 716 of *Metals Handbook*, Volume 7, Ninth Edition, American Society for Metals, 1984, the said pages being incorporated herein by reference. Such materials consist of copper with a finely divided oxide of a metal such as aluminum, silicon, beryllium, magnesium, thorium, zirconium or yttrium distributed therethrough. The materials can be made by powder metallurgy utilizing techniques such as mechanical mixing, coprecipitation and reduction, high energy milling and internal oxidation of the reactive element from a dilute solid solution alloy. Internal oxidation is a preferred technique for producing dispersion-strengthened copper. In a preferred aspect, copper powder containing up to about 1% of 1.5% or 2%, by weight, of aluminum is blended with copper oxide powder, heated to a high temperature at which copper oxide dissociates and the oxygen diffuses through the copper matrix and oxidizes the aluminum. The treated powder is then reduced in, e.g. hydrogen, and consolidated by techniques such as canning, hot extrusion, hot isostatic pressing, hot forging, etc. The product contains dispersed alumina having a particle size of about 3 to about 12 nm (30 to 120 A°) with interparticle spacings ranging from 50 to 100 nm (500 to 1000 A°). Because of the dispersoid, the material offers high strength with high electrical and thermal conductivities. In the drawing FIG. 1 depicts in cross-section a form of composite billet in accordance with the invention.

FIG. 2 is a view in perspective of the composite billet shown in FIG. 1, and

FIG. 3 is a photomicrograph taken at a magnification of 50 diameters showing the bond area between copper and molybdenum as produced in accordance with the invention.

DETAILED DESCRIPTION OF THE INVENTION

The invention will be described in conjunction with the drawing wherein FIG. 1 depicts a composite billet having outer layers 12 of dispersion-strengthened copper and a core 13 of molybdenum. In preparing the billet the surfaces of the molybdenum and copper elements are cut to size and carefully cleaned as by pickling, grinding, etc. The plate elements of copper are wrapped about the molybdenum core and are then welded together by welds 14 as particularly shown in FIG. 2. The assembled billet is heated in a protective atmosphere essentially devoid of oxygen at a temperature within the hot working range for copper, e.g., about 700° to about 1000° C., preferably, about 850° to about 900° C., for a time sufficient to through heat the billet and the hot billet is passed through flat rolls (again in a protective atmosphere) to effect a reduction in thickness of about 35% to about 45%, e.g., 40%. The bonding temperature should be at least 700° C. because the differences in working characteristics between dispersion-strengthened copper and molybdenum become too great at lower temperatures, but should not exceed about 1000° C. to avoid melting the copper. Usually bonding is effected in one or two passes. The protective atmosphere for heating the billet is essentially devoid of oxygen and may be argon, helium, nitrogen, hydrogen, a vacuum, etc. The protective atmosphere employed during hot working may be nitrogen. It is to be borne in mind that molybdenum is a readily oxidizable metal and that some oxides of molybdenum are volatile.

The thickness ratio of molybdenum to copper may be in the range 10% to 90% copper to 10% to 90% molybdenum and is established during the roll bonding step. The thickness ratio does not change materially during subsequent hot or cold reduction to reach the desired thickness.

An example will now be given.

A sandwich type flat billet 15"×17"×0.88" was prepared by assembling a molybdenum plate 0.750" thick with two dispersion-strengthened copper plates of commercial origin 0.065" thick and 15" wide covering the molybdenum. The billet was fastened together by folding the copper over the molybdenum plate and welding the copper together along the front and rear edges of the molybdenum plate, leaving a one-inch projection of the molybdenum plate along the 17" dimension.

Before assembly, the molybdenum plate was given a caustic clean and then an acid clean and was pickled in nitric-sulfuric acid. The dispersion-strengthened copper plates were given a dip in hydrofluoric acid solution for cleaning. The assembled billet was heated in hydrogen for 20 minutes in a 900° C. furnace and reduced in successive passes through flat rolls in three passes to 0.329" thick. Bonding essentially was established in the first pass at a reduction of about 40%. The plate was hot sheared to remove ends and edges and a plate 14"×35" was recovered which had a dispersion-strengthened copper cladding of about 6% on a molybdenum core. About 72% of the weight of the initial billet was recovered as useful product. The hot rolled bonded plate was given a caustic clean and an acid clean and was then cold rolled to 0.040" thick.

FIG. 3 depicts the microstructure of the bond area in the cold rolled sheet thus produced. The interface between molybdenum and copper is sharply defined. The interface resists cleavage therealong despite the fact that there is no material solubility of one metal in the other. No diffusion is detected between the two metals across the interface. The sheet had a T.C.E. of 5.03 ppm° C.

While the invention has been illustrated in terms of dispersion-strengthened copper clad molybdenum sheet, composite sheet consisting of copper having a molybdenum cladding on one or both faces can also be produced in the same fashion.

Further, while the invention has been illustrated in terms of high pressure roll bonding, the initial composite may be bonded using explosive forming techniques. In the latter case, the precautions in regard to protective atmosphere and bonding temperatures should still be observed. Hot pressing, e.g., hot isostatic pressing, may also be employed, as may brazing.

Cold rolling of the composite may be accomplished using conventional techniques.

The composite material is useful in electronics packaging applications where controlled T.C.E. and good thermal conductivity are of critical importance. Desired T.C.E. can be provided by controlling the copper content. The material can also withstand multiple high temperature firing to temperatures up to 900° C., as may be required, for example, in applying a glass or ceramic insulating coating; while still maintaining structural integrity. The material can readily be formed into containers, such as boxes and the like, using conventional metal forming techniques. The stiffness and rigidity of the composite contributes to the production of flat surfaces in the articles formed. High mechanical rigidity and low magnetic susceptibility may be obtained. Dispersion-strengthened copper resists grain growth on repeated heating, so that composites containing dispersion-strengthened copper have improved resistance to delamination when subjected to cyclic heating as compared to composites containing pure copper.

We claim:

1. A roll-bonded composite sheet product having at least one layer of dispersion-strengthened copper and at least one layer of molybdenum, said composite being characterized by a sharply defined, cleavage-resistant interface between said copper and said molybdenum with substantially no detectable diffusion of one metal into the other across said interface, said composite being resistant to delamination and being capable of maintaining structural integrity upon repeated high temperature firings at temperatures up to 900° C.

2. A composite sheet product in accordance with claim 1 having a core layer of molybdenum and facing layers of dispersion-strengthened copper.

3. A composite sheet product in accordance with claim 1 having a core layer of dispersion-strengthened copper and facing layers of molybdenum.

4. A composite sheet product in accordance with claim 1 having a dispersion-strengthened copper thickness of about 10% to about 90% of the total thickness of the composite sheet.

5. A package for holding electronic components made from a roll bonded composite dispersion-strengthened copper-molybdenum sheet having copper thickness of about 10% to about 90% of the total thickness of said sheet and having a combination of properties including Thermal Coefficient of Expansion, strength, density, conductivity and modulus controlled by controlling the copper thickness, said roll-bonded composite being produced by roll-bonding in the temperature range of about 700 to 1000° C., and being characterized by a sharply defined, cleavage-resistant interface between said copper and said molybdenum with substantially no detectable diffusion of one metal into the other across said interface, said composite being resistant to delamination and being capable of maintaining structural integrity upon repeated high temperature firings at temperatures up to 900° C.

* * * * *